(No Model.)  
9 Sheets—Sheet 1.

E. C. BENNETT.
MACHINE FOR FORMING AND DRIVING COMPOUND PEGS.

No. 336,547.  
Patented Feb. 23, 1886.

WITNESSES  
Frank L. Parker  
Chas. Spaulding

INVENTOR  
Eleazer C. Bennett

Fig. 1.

(No Model.) 9 Sheets—Sheet 2.
E. C. BENNETT.
MACHINE FOR FORMING AND DRIVING COMPOUND PEGS.
No. 336,547. Patented Feb. 23, 1886.

Fig. 2

WITNESSES
Frank G. Parker
Chas. Spaulding

INVENTOR
Eleazer C. Bennett (No Model.) 9 Sheets—Sheet 3.
E. C. BENNETT.
MACHINE FOR FORMING AND DRIVING COMPOUND PEGS.
No. 336,547. Patented Feb. 23, 1886.

Fig. 3.

WITNESSES
Frank G. Parker.
Chas. Spaulding.

INVENTOR
Eleazer C. Bennett.

(No Model.) 9 Sheets—Sheet 5.

E. C. BENNETT.
MACHINE FOR FORMING AND DRIVING COMPOUND PEGS.

No. 336,547. Patented Feb. 23, 1886.

WITNESSES
Frank G. Parker.
Chas. Spaulding.

INVENTOR
Eleazer C. Bennett.

(No Model.) 9 Sheets—Sheet 6.

E. C. BENNETT.
MACHINE FOR FORMING AND DRIVING COMPOUND PEGS.

No. 336,547. Patented Feb. 23, 1886.

WITNESSES
Frank G. Parker
Chas. Spaulding

INVENTOR
Eleazer C. Bennett (No Model.) 9 Sheets—Sheet 8.
E. C. BENNETT.
MACHINE FOR FORMING AND DRIVING COMPOUND PEGS.
No. 336,547. Patented Feb. 23, 1886.

WITNESSES
Frank H. Parker.
Chas. Spaulding.

INVENTOR
Eleazer C. Bennett.

(No Model.) 9 Sheets—Sheet 9.

E. C. BENNETT.
MACHINE FOR FORMING AND DRIVING COMPOUND PEGS.

No. 336,547. Patented Feb. 23, 1886.

WITNESSES
Franklin Parker.
Chas. Spaulding.

INVENTOR
Eleazer C. Bennett.

UNITED STATES PATENT OFFICE.

ELEAZER C. BENNETT, OF EAST BRIDGEWATER, MASSACHUSETTS.

MACHINE FOR FORMING AND DRIVING COMPOUND PEGS.

SPECIFICATION forming part of Letters Patent No. 336,547, dated February 23, 1886.

Application filed August 19, 1885. Serial No. 174,838. (No model.)

*To all whom it may concern:*

Be it known that I, ELEAZER C. BENNETT, of East Bridgewater, in the county of Plymouth and State of Massachusetts, have invented certain new and useful Improvements in Machines for Forming and Driving Compound Pegs for Boots and Shoes, of which the following, taken in connection with the accompanying drawings, is a specification.

The object of this invention is to furnish a rapidly-working machine which shall form and drive a compound peg recently invented by me and described in the specification of an application of even date, said application being entitled "improvement in the method of making boots and shoes, the peg being composed of a central core of wood or metal and a strip of thin metal so bent as to embrace two sides of the core and to extend a small distance below the point of said core, which admits the outer part of the peg after the same has been driven through the stock to be headed against the inner surface of the inner sole, thus securing a very firm and flexible fastening. I attain this object by the mechanism shown in the accompanying drawings, in which—

Fig. 9 is a section on line $z'\ z'$, Fig. 2, taken from the rear. Figs. 18, 19, 19$^a$, and 19$^b$ are details relating to the mechanism for wire-cutting. Figs. 20 and 20$^a$ are details relating to the mechanism for operating the wire-bending device. Fig. 21 is a vertical section on line $z^3\ z^3$, Fig. 3, illustrating the mechanism for operating the sliding plates. Fig. 22 is a horizontal section taken on line $z^4\ z^4$ of Fig. 21. Figs. 23 and 23$^a$ are side and end elevations showing the clamp-moving mechanism, Fig. 24 being a cross-section taken in line $z^5\ z^5$ in Fig. 23.

Figure 28:
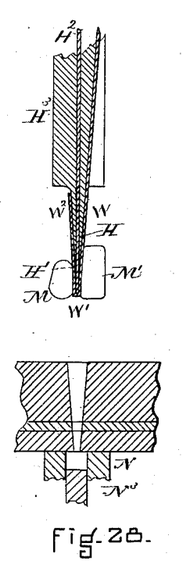
Figure 29:
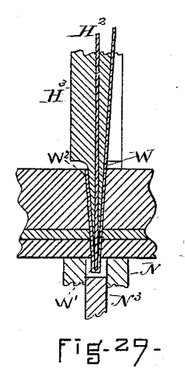
Figures 30, 31:
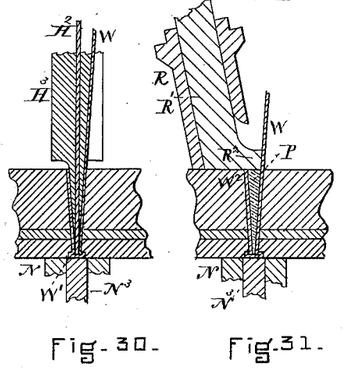
Figure 32:
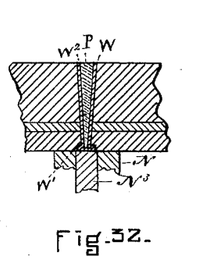

For a better understanding of my machine, I will briefly explain the construction of the compound peg. This is shown at W P, Fig. 32, Sheet 9, in which W W' W$^2$ is a strip of flat wire bent, as shown in Figs. 28 and 29, so as to form a V. The point—that is, the lower end—being upset after insertion, as shown in Fig. 30, to form a head, then the wire-carrying device is withdrawn, and the wood-peg P is inserted, as shown in Fig. 31, and finally the part W is cut off, which completes the operation, and leaves the compound peg W W' W$^2$ P in the shoes, as shown in Fig. 32.

In this machine, like all of its class, the shoe is placed upon the horn, and is acted upon first by the awl, which performs the double function of piercing the sole and of feeding the same along to a position in which the puncture thus made is immediately over the center of the horn, and in this position the shoe remains until all of the work required to complete a fastening is accomplished. This requires the machine to be so constructed that the several devices required to perform the successive steps—viz., making the puncture, carrying down the wire, forming and bending it, inserting the peg-wood, and cutting off the wire—must all occupy the same place when doing their work, and must each retire so as to give room for the next device to accomplish its functions. To effect this result, I attach the awl E, Fig. 4, Sheet 4, and Figs. 21 and 22, Sheet 8, by means of a set-screw, $e$, (see Fig. 4,) and bracket-pieces or awl-holder $e^2$ to the horizontally-sliding plate C, Figs. 21 and 22, said horizontal sliding plate C being inserted in a vertically-sliding plate, D.

Figures 21, 22, 23, 24, 25:
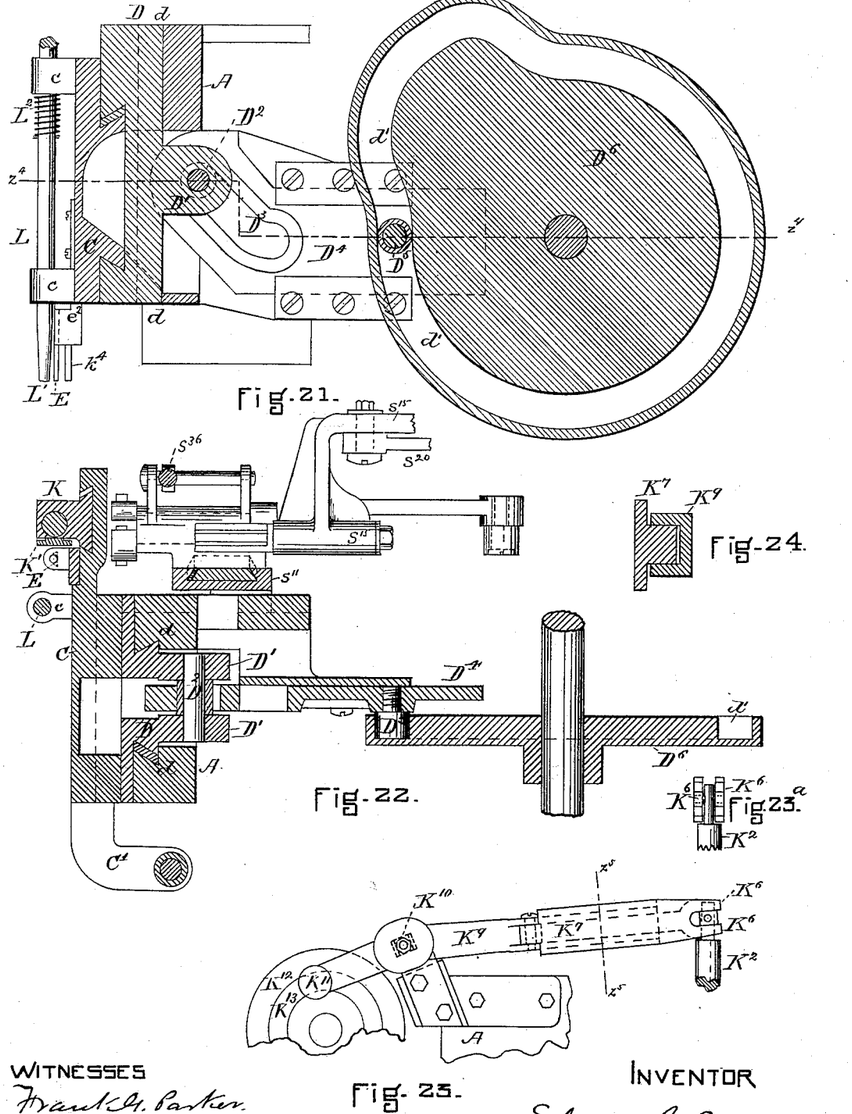

Vertical motion is given to the sliding plates D and C by mechanism shown in Figs. 21 and 22. The plate D slides in dovetailed ways $d$ $d$, made in the frame A, Figs. 21 and 22.

D' D' are ears extending from the plate D, and serve to hold a cam pin and roller, D$^2$. The cam pin and roller D$^2$ pass through an inclined slot, D$^3$, made in the cam-plate D$^4$. The cam-plate D$^4$ has a pin or roller, D$^5$, which works in a cam-slot, $d'$, of the cam $D^6$, so that as the cam $D^6$ revolves the cam-plate $D^4$ will move back and forth, and thus impart an up-and-down motion to the sliding plate D, and through the said plate D also to the plate C, Figs. 21 and 22. I also attach to this horizontally-sliding plate C the gage L L', which slides through lugs $c$ $c$ when operated, and being kept down firmly against the shoes by means of the spring $L^2$, Figs. 1 and 21. I also insert in ways formed in the plate C the wire forming and inserting devices, Fig. 4, and their adjuncts. The cutting-off device S S', Fig. 1, operates independently in slides of its own. The benders M M' and their connecting parts—namely, the bender-holder $M^6$ and the carrier-piece $M^8$, Figs. 2 and 20—are thrown into their working position by lever $M^9$ and cam $M^{13}$, Fig. 20. The wood-peg driver R is brought into its place of action by means of the lever $R^5$ and its connections by the action of the cam $R^{20}$, Figs. 1 and 3.

Having briefly set forth the general principles of my machine, I will now proceed to describe the parts in detail. The awl E is not round, but wedge-shaped, being about one-sixteenth of an inch wide, and is held in an awl-holder, $e^2$, by a clamp-screw, $e^3$, and a vertically-adjusting screw, $e'$, Fig. 4. The awl E, (see Figs. 4 and 21,) being attached to the sliding plate C, Fig. 3, is operated by means of an arm, C', which has a vertical pin, $c^4$, Figs. 1 and 3, which engages with a slot, $C^3$, made in the sliding cam-plate $C^2$, said sliding plate being operated horizontally by a cam-groove made in the cam-wheel $C^6$, acting upon the pin and bracket $C^5$ $C^4$, Fig. 3, the bracket $C^4$ being attached to the slide $C^2$.

Figure 1:
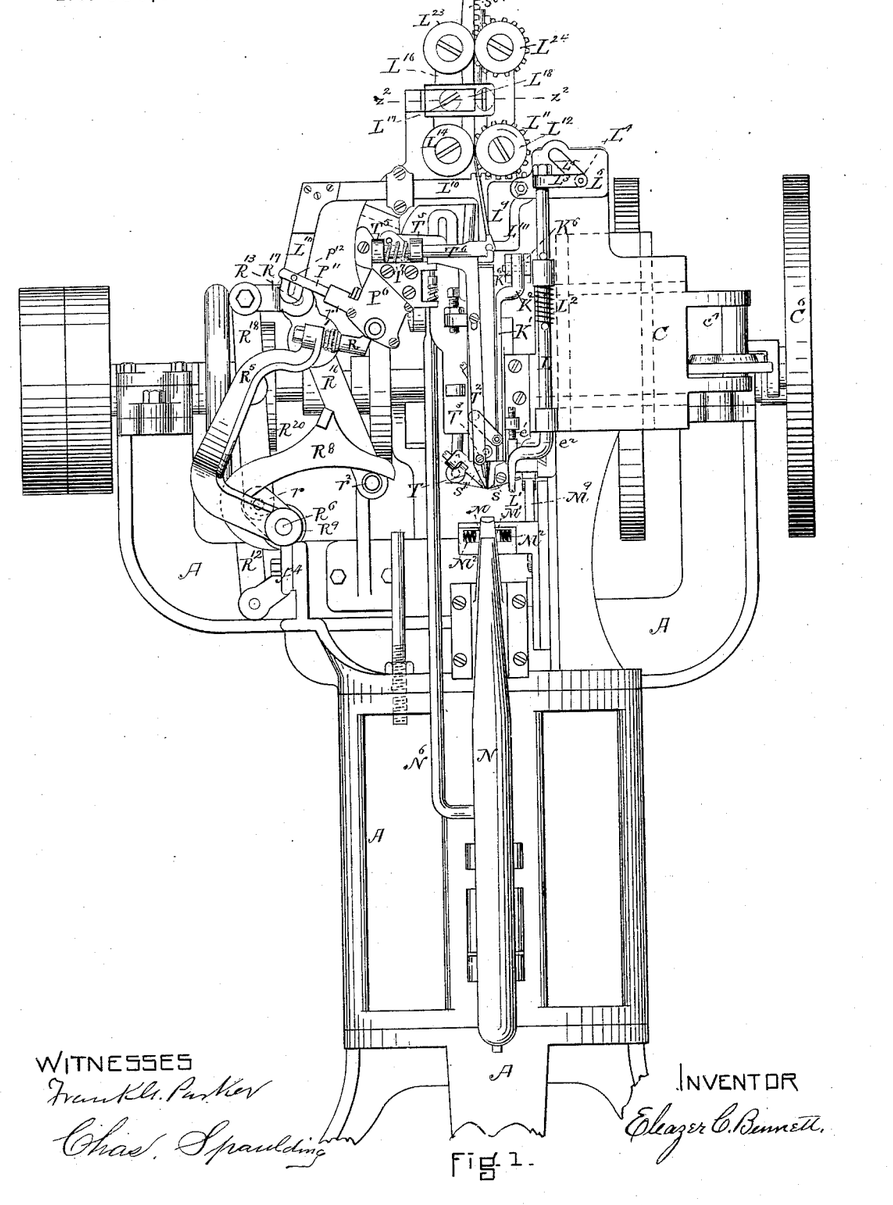
Figure 1 is a front elevation of my machine.
Figure 2:
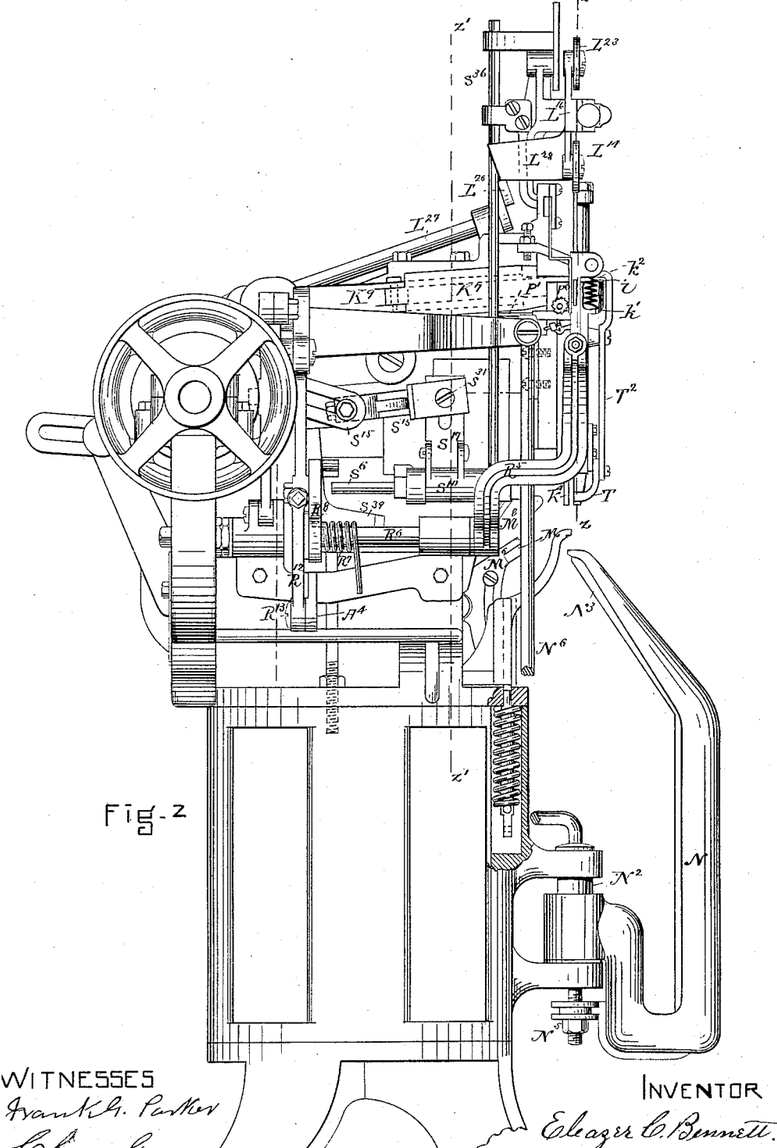
Fig. 2 is a side elevation of the same.
Figure 3:
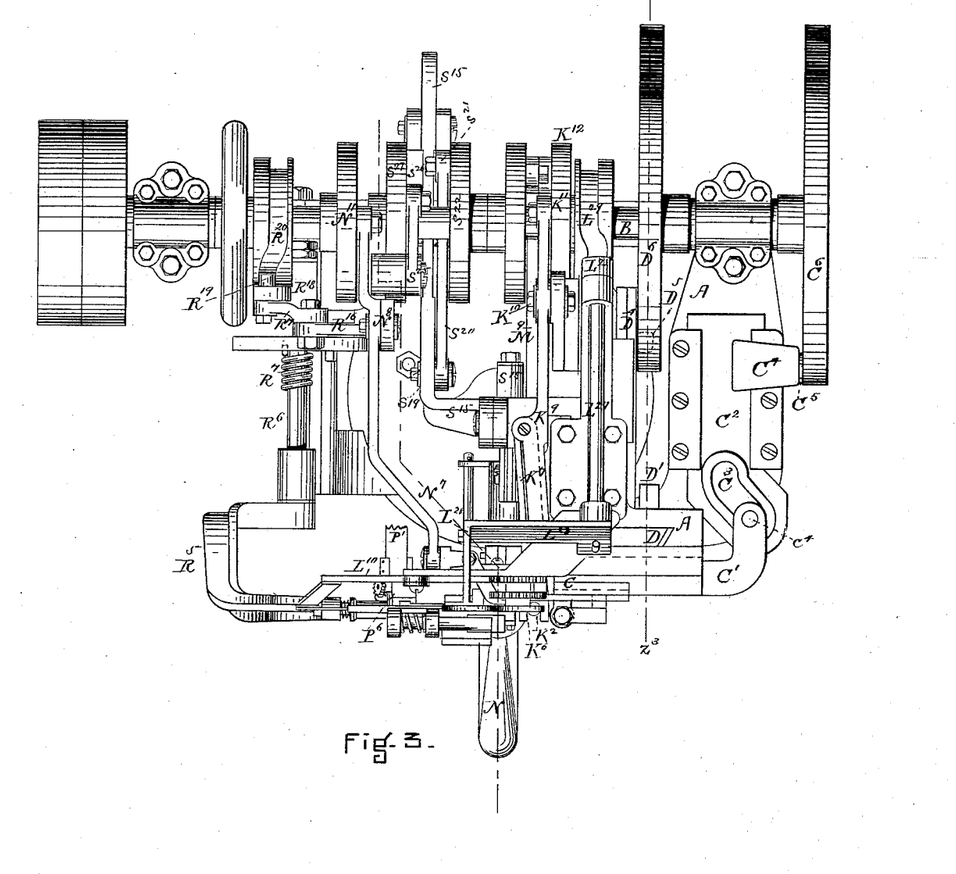
Fig. 3 is a plan.

By inspection of Fig. 3 it may be seen that as the slide $C^2$ moves back and forth it will cause the pin $c^4$ in the slot $C^3$ to move to the right and left. As the pin $c^4$ is made long, as shown in Fig. 1, it admits of the plate C having a vertical motion as well as a horizontal one, thus giving the desired motions directly to the awl E, and directly and indirectly to the gage L L', Fig. 1. These motions give all of the necessary movements to the awl E required to enable it to do its work.

Figures 4, 5, 6, 7, 8:
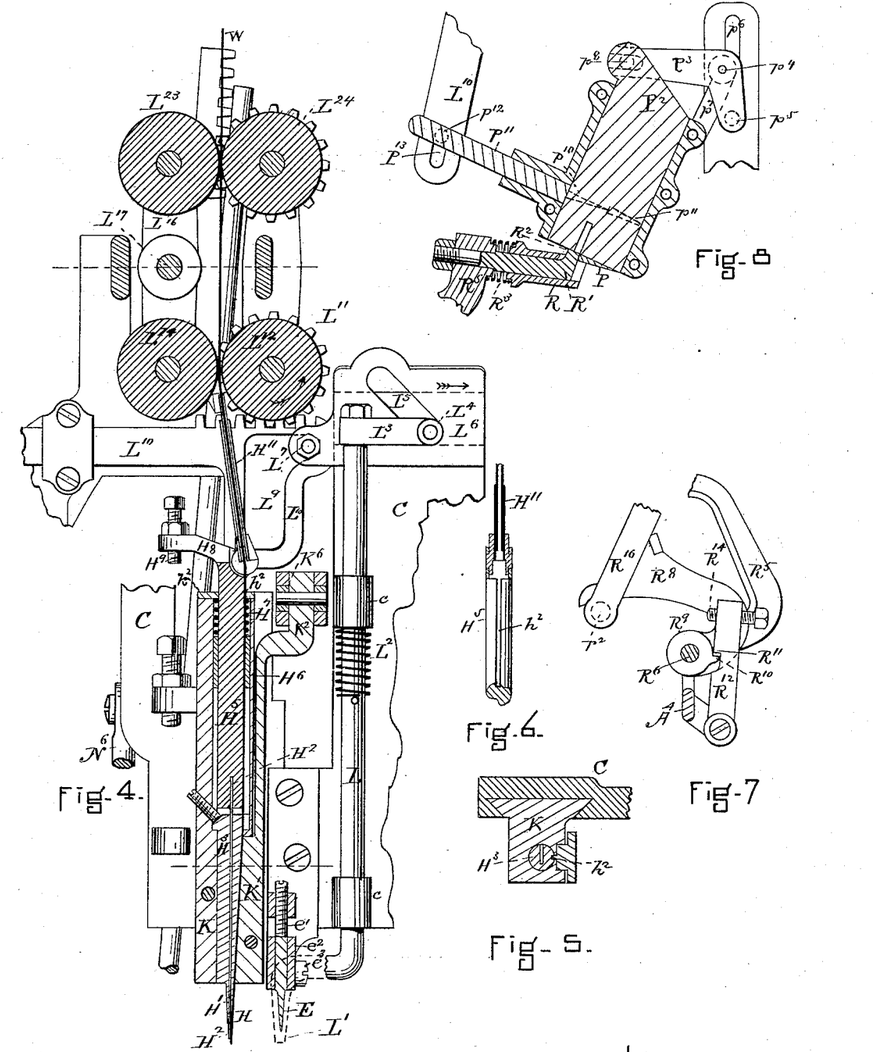
Fig. 4 is a vertical section taken on line $z\ z$ of Fig. 2, showing the wire-feeding-in mechanism, the plane of the section being parallel to the front elevation of the machine.
Figs. 5 and 6 are details relating to the wire-feeding-in mechanism.
Figs. 7 and 8 relate to the wood-peg mechanism.

L L', Figs. 1 and 4, is a gage which moves in bosses attached to the sliding plate C, and is held firmly onto the sole of the shoe by the spring $L^2$. This gage L has the same horizontal movement that the awl E has, but does not partake of all of the vertical movements of the awl. Thus in the downward movement of the slide C the awl E and the gage L accompany each other until the gage strikes the sole of the shoe. Now, the awl continues to move on and penetrates the leather—i. e., passes through it; but when the gage L strikes the sole it stops and rests upon it. This cessation of motion of the gage L and continued motion of the plate C causes the roller $L^4$ on the arm $L^3$ (attached to the gage L) to force the sliding plate $L^6$ (which is descending with the plate C) to move in the direction of the arrow shown near $L^4$, Fig. 4. The movement of the slide $L^6$ is communicated to the rack-slide $L^{10}$ through the roll and pin $L^7$, which in turn, acting through the gear $L^{11}$, causes the feed-wheel $L^{12}$ to turn in the direction of the arrow on said wheel. The open space $L^9$ in the rack-slide $L^{10}$, Fig. 4, is made so that the motion of the roller $L^7$ on the slide $L^6$ (which I have called the "index-slide" for the reason that it indicates the distance between the lower end, L', of the gage when down and the upper end of the horn, that is, the thickness of the sole) shall have no effect upon the rack-slide while the sliding plate C is moving the awl E to its place over the shoe in its descent to the sole. At the time when the point of the awl touches the sole the gage will also touch and act on the index-plate $L^6$, as has been described. The awl continues its descent, and is moved forward by the sliding plate C, so as to feed the shoe on the horn until the awl is directly over the center of the header $N^3$ in the horn N. The pressure-foot holding the shoe after being fed, the vertical movement of the awl continues until it reaches its highest point, thence by movement of the horizontal sliding block the awl returns to its original position, and there it remains stationary until all the other operations have been performed for completing the fastening.

Figure 25:
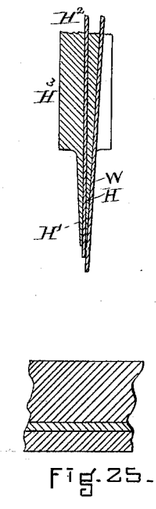
Figs. 25, 25$^a$, 26, 27, 28, 29, 30, 31, and 32 are intended to illustrate the different steps in forming and driving my improved compound peg.
Figures 25A, 26, 27:
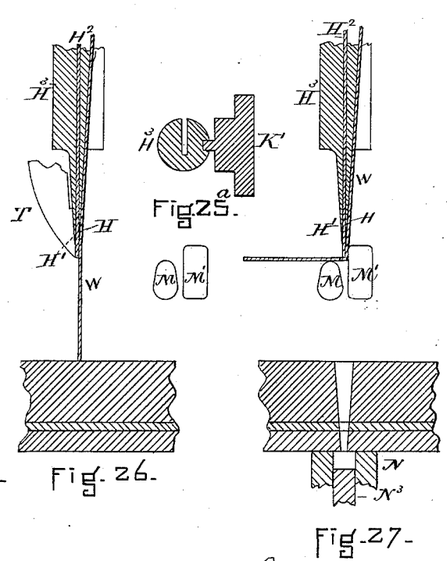

The wire W is fed into the machine by the following mechanism: It is first passed to the first pair of feeding-rollers, $L^{23}$ $L^{24}$, Figs. 4 and 9; thence to the feed-rolls $L^{12}$ $L^{14}$; thence to the tube $H^{11}$; thence into a groove, $h^2$, (see Figs. 4 and 5,) made in the former-piston $H^5$; thence down into a groove made in the former-bar $H^3$; thence down past the points of the former H H'. The former-piston $H^5$, Fig. 4, has upon it a fixed collar, $H^6$, against which a spring, $H^7$, pushes, the upper end of the spring $H^7$ being held in place by a plate, $k^2$, attached to the former-plate K'. The action of this spring is to throw the piston $H^5$ downward, (after the binders have done their work, as will be hereinafter described,) and thus carry the central former-plate, $H^2$, downward. This action will carry the looped wire sufficiently below the points of the former H H', as shown in Fig. 29, to admit of the formation of the head W, as shown in Fig. 30, the former-plate $H^2$ being withdrawn at the same time and with the same motion that the header approaches it, which action I will now explain. The header being controlled by the lever $N^7$, Fig. 13, as has already been set forth, and this lever $N^7$ having upon it a boss, $H^{10}$, which in its upward motion comes in contact with the end of the screw $H^9$, connected by the arm $H^8$ to the piston $H^5$, must cause both the header and the central former-plate, $H^2$, to move together. After the wire W has been fed down, as indicated at Fig. 26, then the benders M M' come into place and the formers H H' move laterally, the benders now being stationary, so as to bend the wire W at right angles, as shown in Fig. 27. Now, the formers descend between the benders M M' and double the wire, as indicated at W W' W², Fig. 28. The next step is for the benders M M' to withdraw and to allow the wire being forced down through the sole, as shown in Fig. 29, ready for the action of the headers, as will be hereinafter explained.

Figures 18, 19, 19A, 19B, 20, 20A:
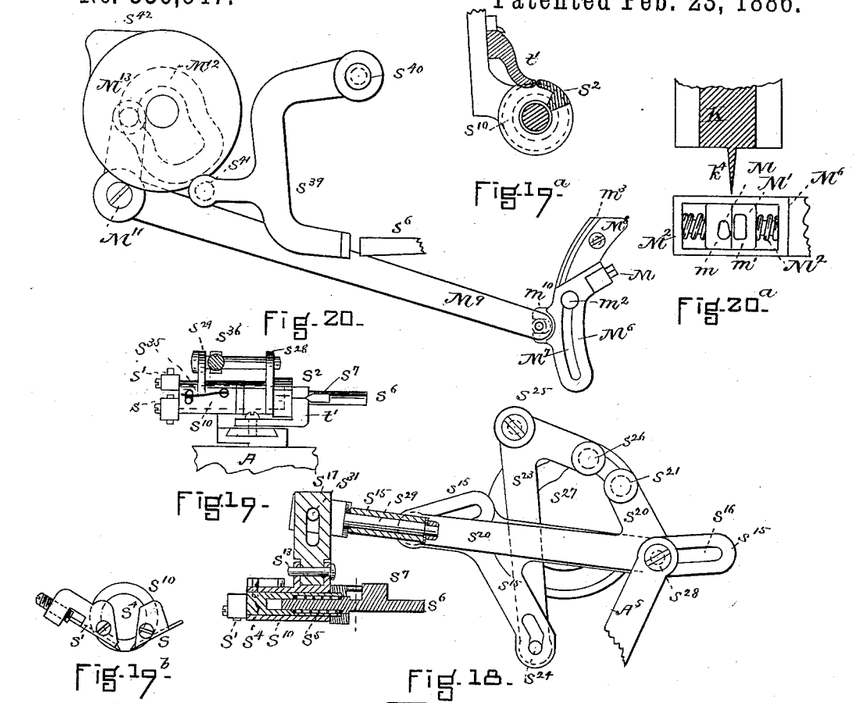

The mechanical device by which motion is given to the benders M M' may be explained as follows: The benders proper, M M', Figs. 1 and 2, 20 and 20ª, are attached to blocks $m\ m'$, located in the end of the bender-holder M⁶, these blocks being held together by springs M² M², Figs. 1 and 20, so that they may yield to the combined action of the formers H H' and the descending wedge $k^4$, this wedge being shown at Fig. 20ª. M⁸, Fig. 20, is a carrier-piece curved and having in it a groove, $m^3$. On this stationary curved piece M⁸ the bender-holder M⁶ slides, the said holder being provided with a long curved slot, M⁷, which engages with the fixed pin $m^2$, attached to the carrier-piece M⁸. M⁹ is a bent lever pivoted at M¹¹, and is operated by a cam-groove, M¹², made in the cam M¹³, the working end of the lever M⁹ engaging by means of a pin with a forked projection, $m^{10}$, made in the carrier-piece M⁸.

The mechanism by which the former-plate K and its included clamping or wire-holding device is operated is illustrated in detail in Fig. 23, and also in part in Figs. 1 and 4. As the wedge-shaped former-plate K' moves vertically in the plate C and horizontally with it, it is necessary that the lever which operates it shall be so joined as to admit of its working end to swing in a horizontal plane. This is illustrated in Figs. 23 and 24, in which K² represents a vertical projection extending upward from the wedge-shaped former-plate K, Fig. 4. The upper end of the projection K² is connected by a swivel-joint, K⁶ K⁶, Fig. 23, to the swinging end K⁷ of the cam-lever K⁹ K⁷, (see Figs. 23 and 24.) This swinging end K⁷ of the lever K⁹ K⁷ is formed in section taken in line Z⁵ Z⁵, as shown in Fig. 24, and in end elevation, as shown in Fig. 23ª. The part K⁹ of this lever is shown in Fig. 23. The swinging part K⁷ is free to move horizontally to the left in relation to the lever K⁹. Its motion to the right horizontally is limited, and it has no motion in a vertical plane independent of the lever K⁹. This lever K⁹ K⁷ is pivoted to the solid part of the machine by a pivot in a sliding box at K¹⁰, so that it may have a slight longitudinal motion, and is operated by the cam K¹², the slot of which, K¹³, engages with the pin K¹¹.

Figures 7, 10, 11:
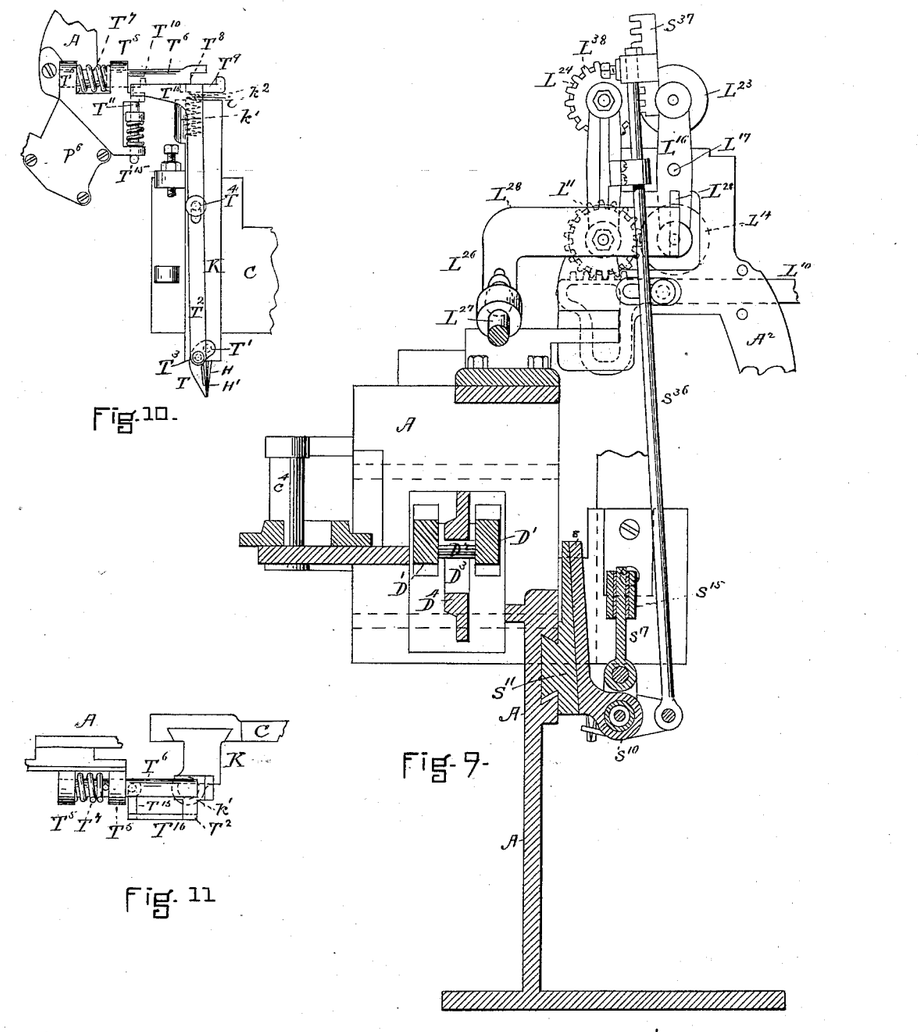
Figs. 10 and 11 are detail views illustrating a device which I use for supporting the wire-former at certain times.

The formers H H' (see Figs. 4, 10, 25, and 26) being quite slender, require an additional support when they perform the work of bending, as indicated at Fig. 27. I will now describe my method of accomplishing this. T, Figs. 10 and 26, is a supporting-piece, which swings upon a pivot, T', inserted in the former-plate K, and is connected by a pivot, T³, to a sliding rod, T², Fig. 10. This sliding rod T² is held in place by a screw, T⁴, said screw T⁴ passing through a slot in the rod T², thus allowing the rod T² to have a slight vertical motion in relation to the former-plate K. This vertical motion of the plate K throws the support T against the former H when it is down, as shown in Fig. 10; but when the rod T² moves up the support T is thrown backward and upward. This action allows the formers H and H' to carry the bent wire down into the soles of the shoe, as indicated at Fig. 29. The upper motion of the rod T², which throws the former-support T back and out of the way, is effected by a spring, $i$, (shown in dotted lines in Fig. 10, and in full line in Fig. 2,) inserted in a recess at $k'$, in the upper part of the former-plate K. (See Figs. 10 and 11.) The relative downward motion of the rod T²—that is, the motion which throws the support T into its working place—is effected by means of a bolt, T⁶, Figs. 10 and 11. This sliding rod T⁶, being connected to the frame A by ears T⁵ T⁵, is pressed forward by means of the spring T⁷, where it remains until the lateral movement of the plate C forces the lug T⁹, at the top of the rod T², against the shoulder T⁸. This throws the rod T⁶ back and allows the spring-pin T¹¹ to catch into the notch T¹⁰, and thus hold the rod T⁶ back. Now, as the formers H H' begin to retreat (as they must to make the bend in the wire W⁶, as indicated at Fig. 27) the head of the rod T², Fig. 10, will be drawn off the shoulder T⁸ on the rod T⁶, which action will allow the rod T² to spring up into the notch T¹⁰, and thus throw the support T back and out of the way, so that the next motion of the formers can take place. This motion is directly vertical, forcing the formers H H' down between the benders M M', Fig. 28. When the benders M M' have performed their work, they are withdrawn, as has already been explained, and the downward motion continues, carrying the bent wire into the soles, as shown in Fig. 29. During the downward motion of the formers the arm T¹⁶ on the rod T², Fig. 10, comes in contact with the projecting pin T¹⁵ on the spring catch-pin T¹¹ and draws the said catch-pin T¹¹ out of the notch T¹⁰ in the rod T⁶, so that the rod T⁶ may spring forward to the position shown in Fig. 10 and be ready for the next operation.

Figures 12, 13, 14, 15:
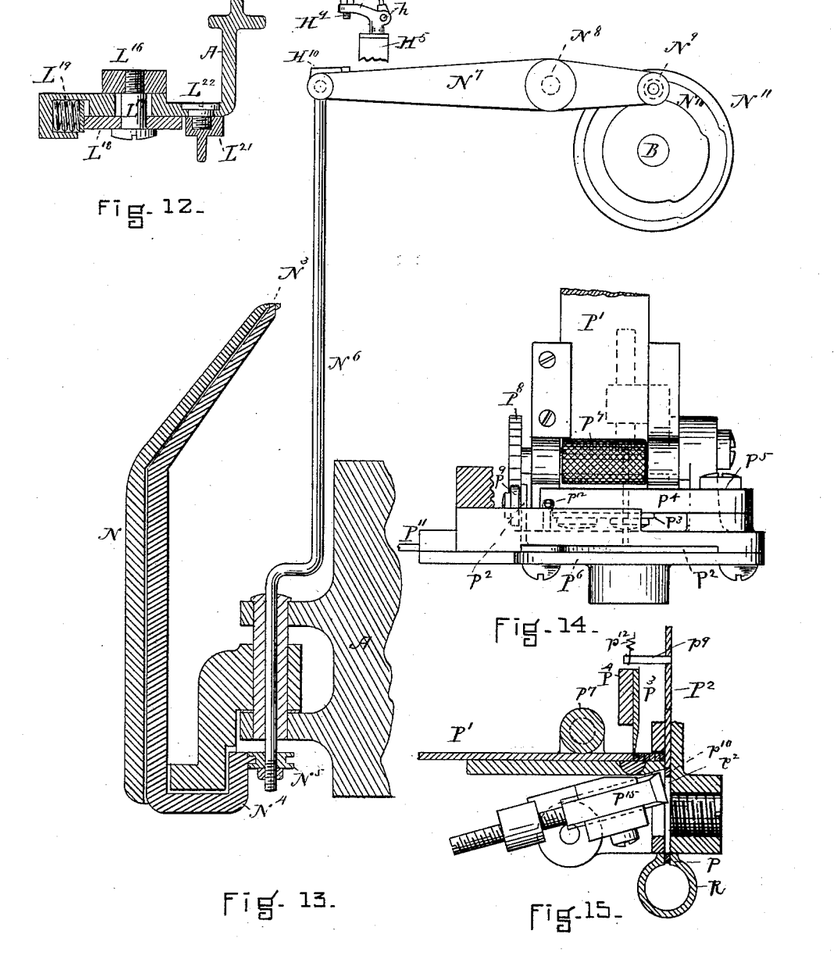
Fig. 12 is a section taken on line $z^2\ z^2$, Fig. 1.
Fig. 13 is a vertical section showing the horn-moving mechanism.
Figs. 14, 15, 16, and 17 are details relating to the wood-peg mechanism.

The horn N, Fig. 13, operates, in the usual manner, as a support for the shoe, and carrying with it what I have called the "heading" device—that is, a device which forms the loop or head W', Figs. 30, 31, and 32, of the folded wire. This header N³ is connected at the lower end, N⁴, by a swivel, N⁵, to the rod N⁶, the rod N⁶ being operated by the lever N⁷, which swings upon a fulcrum, N⁸, and receives its motion from the cam-pin N⁹ and the cam-groove N¹⁰ in the cam N¹¹.

The wood part of the peg P, Figs. 31 and 32, is made wedge shape—that is, it has two parallel sides and two inclined sides—and is inserted between the folds of the wire W W², Figs. 31 and 32. This peg is made by the mechanism shown in detail in Figs. 8, 14, 15, 16, and 17, the mechanism being located at P⁶, Figs. 1, 2, and 3.

Figures 16, 17:
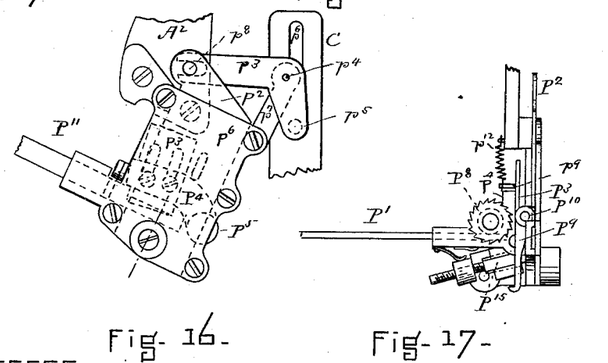

The peg-wood strip P', Figs. 14, 15, and 17, is made of a width corresponding to the longest peg required, and in cross-section is wedge-shaped, so that each peg cut off by the knife P³, Figs. 15 and 17, is a wedge, as has already been stated.

The peg-wood strip P', Figs. 14, 15, and 17, is fed into the machine by means of the feed-roll P⁷. This feed-roll is operated by a ratchet-wheel, P⁸, Figs. 14 and 17, and a pawl, P⁹. This pawl P⁹ is connected by a pivot, P¹⁰, to the pusher P², so that as the pusher P² is withdrawn it will cause the hook of the pawl P⁹ to engage with the ratchet-wheel P⁸ and cause it to turn the feed-roll P⁷ (see Figs. 15 and 17) sufficiently to forward another peg into the delivery-slot $p^2$, Fig. 15. This takes place while the pusher P² is at the upper part of its stroke—that is, in a position to leave room for a peg to pass under it into the delivery-slot $p^2$.

Motion is imparted to the pusher P² by means of the bell-crank lever $p^3$, Figs. 8 and 16, the end of which is forked, as shown, so as to engage with the pin $p^8$ on the upper part of the pusher P². This bell-crank lever $p^3$ is pivoted at $p^4$ to a part, $p^7$, attached to the frame of the machine, and is operated by the sliding plate C, which has a slot, $p^6$, in which a pin, $p^5$, on the lower end of the lever $p^3$, engages.

P³, Figs. 14, 15, and 17, is a knife, which serves to sever the peg from the peg-strip, and is attached to a swinging lever, P⁴, which is pivoted at P⁵, Figs. 14 and 16, and is thrown upward by a spring, $p^{12}$, Fig. 17, and is pressed down, so as to sever the peg from the wood, by a pin, $p^9$, which extends from the pusher P², as shown in Fig. 15. It will be observed that the knife P³ is at such a distance from the pusher P² as to leave room between them for several pegs, as shown in Fig. 15, so that there are a number of pegs already severed from the peg-wood ready to be pressed forward, as required, by the feed-rolls to be used. Now, the severed peg has been pushed by P² down into the slot $p^2$, so as to occupy the position $p^{10}$, Fig. 15, this position being indicated by dotted lines at $p^{10}$, Fig. 8. Now, the pusher P² stops, and the plunger P¹¹, Fig. 8, forces the peg over to the position indicated in dotted lines $p^{11}$, Fig. 8. Now, the plunger P¹¹ is withdrawn, and the pusher P² carries the peg to the swinging knife P¹⁵, Fig. 15, which, moving with the peg, cuts it off to the desired length. The motion of the pusher P² continues until it has fed the peg down into the recess formed in the tube R, the peg being indicated by P.

The length of the peg P is determined by the motion of the plunger P¹¹—that is, if the plunger P¹¹ moves sufficiently to pass the entire length of the peg beyond the edge of the cutting-off knife P¹⁵, then the peg would retain its original length; but if the plunger does not carry it entirely past the knife P¹⁵, then more or less of the thick part of the end of the peg will be cut off, making the peg longer or shorter.

Motion is imparted to the plunger P¹¹ by the rack-arm L¹⁰, Fig. 1, the lower end of this rack-arm having a slot, P¹³, in which a pin, P¹², on the plunger P¹¹ engages, and as the motion of this rack-arm L¹⁰ is (as has already been explained) governed by the gage L L' it is plain that the length of the peg after being cut off will correspond with the thickness of the bottoming of the shoe.

The peg when completed is delivered to the hammer as is shown in Figs. 8 and 15, the peg being represented by P. The head of the peg bears against the face R² of the hammer R'. The tube R, which holds the peg, slides on the round part of the hammer R', Fig. 8, and is held in the position there shown by the spring R³. All of these parts are so arranged that when the peg P enters the sole of the shoe the tube R will follow it until the end of the tube strikes the sole. The tube R will then stop, but the hammer proper, R', will continue its motion until the peg is driven completely into the sole. Then as the hammer R' retreats the tube R will again be thrown forward by the spring R³ to the position shown in Fig. 8, where it is ready to receive the next peg.

Motion is imparted to the hammer by the following device: The hammer-handle R⁵ is attached rigidly to a revolving axis, R⁶, Figs. 1 and 3. This revolving axis is surrounded by a torsion-spring, R⁷, Fig. 3, the tendency of which is to throw the hammer down onto the sole.

The hammer is drawn back by the following device: R¹⁸, Figs. 1 and 3, is a lever pivoted to the frame of the machine at $r$. This lever R¹⁸ has a cam pin and roller, R¹⁹, which engages with a cam-groove in the cam R²⁰. To the top of the lever R¹⁸, I attach the link R¹⁷, which connects with the lever R¹⁶ by a pivot, R¹³. This lever R¹⁶ swings on a pivot, $r'$, Fig. 1, so that any movement of the lever R¹⁸ is communicated to the lever R¹⁶ by the link R¹⁷. At the lower end of the lever R¹⁶, I place a pin and roller, $r^2$, upon which the arm R⁸ rests. This arm R⁸ is attached rigidly to the shaft R⁶, Figs. 1 and 7, so that any movement of the arm R⁸ must have a corresponding movement of the shaft R⁶ and the hammer R' R.

In Fig. 1 the hammer is represented to be in its highest position—that is, the upper end of the lever R¹⁸ is thrown by the action of the cam R²⁰ to the left—which movement throws the lower end of the lever R¹⁶ over to the right—that is, near to the outer end of the lever R⁸; but as the cam R²⁰ continues to revolve, then the upper end of the lever R¹⁸ goes to the right and the lower end of the lever R¹⁶, Fig. 1, goes to the left, which action will allow the arm R⁸ to fall, and of course allow the hammer to fall slowly with it. This gradual lowering of the hammer will continue until the hammer is caught by a device to be explained hereinafter. The curve of the lower edge of the lever $R^8$ is concentric with the hammer-shaft $R^6$, so that after reaching this point the roller $r^2$ will have no power to check the movement of the lever $R^8$ or of the hammer. After the roll $r^2$ has moved a short distance to the left a pawl, $R^{12}$, (attached to the frame of the machine by a bracket, $A^4$, Figs. 1 and 7,) having a catch, $R^{11}$, engages with a projection, $R^{10}$, on the boss $R^9$ of the hammer-handle $R^5$, and checks its further motion; but when the lower end of the lever $R^{16}$ comes in contact with the end of the screw $R^{14}$ in the pawl $R^{12}$ it throws the pawl back, so as to release the projection $R^{10}$. This action will allow the spring $R^7$, Fig. 3, to act with full force on the hammer, and thus complete the hammer-stroke, giving it a rapid final motion, so as to drive the peg completely into the sole.

The final operation of my machine consists in cutting off the wire at the outer surface of the sole. This is done by what I call a "cutter-head," which is in construction and mode of operation substantially like a head of a pair of ordinary cutting-nippers. The principal difference is that I dispense with the long levers or handles and place in their stead very short ones, one of which is stationary, while the other moves about a pivot common to both the stationary and movable parts or jaws, the movement being obtained by means of a wedge, which is forced between the back extension of the movable jaw and a back extension of the fixed jaw. This cutter-head is shown in details at Figs. 18 and $19^a$ and $19^b$, and consists of a fixed cutter-head, $S^{10}$, to which is attached the fixed knife S and a cutter-head, $S^4$, to which is attached the moving knife $S'$. Motion is imparted to the movable knife $S'$ by means of the wedge $S^7$, Fig. 19, said wedge being attached to a plunger-piece, $S^6$, Figs. 18 and 19, this wedge coming between the point of the lug $t'$, Figs. 19 and $19^a$, attached to the fixed cutter-holder $S^{10}$, and the lug $S^2$, attached to the revolving cutter-head $S^4$, forces the cutter $S'$ around and against the edge of the cutter S, thus severing the wire. The plunger $S^6$ is forced back and out of action by the spring $S^5$, Fig. 18. At the same time the moving cutter $S'$ is separated from the fixed cutter S by the action of the spring $S^{35}$, Fig. 19. The motion of the cutter-head is accomplished as follows: $S^{10}$ has a shank, $s$, as shown in Fig. 9, which slides vertically in a horizontally-sliding plate, $S^{11}$, the plate $S^{11}$ sliding in a dovetailed groove formed in the frame A of the machine. The cutter-head proper, $S^{10}$, (moving in a vertical plane which is at right angles to the front elevation of the machine, and passing through the center of the horn,) is moved both horizontally and vertically by the devices shown in Fig. 18.

Attached to the fixed jaws of the cutter $S^{10}$ by means of a pin, $S^{13}$, Fig. 18, is an oscillating arm, $S^{17}$, which is in turn connected to the lever $S^{15}$ by a stud, $S^{31}$, and a slide-piece, $S^{29}$. The joint between the oscillating arm $S^{17}$ and the sliding piece $S^{29}$ is made so that the part $S^{17}$ only moves with considerable friction, and of course would remain stationary in relation to the sliding piece $S^{29}$ and lever $S^{15}$, except the motion of it and the fixed cutter-head $S^4$ is resisted, as takes place when the cutter-head comes in contact with the sole of the shoe. The lever $S^{15}$ gives vertical motion to the cutter-head, and has a slot, $S^{16}$, at its rear end, through which the fixed stud $S^{28}$ passes, and serves as a fulcrum as well as a guide to the part $S^{15}$.

$A^5$, to which the fixed stud $S^{28}$ is attached, forms a part of the frame of the machine.

A back-and-forth horizontal motion is imparted to the lever $S^{15}$ by means of the bent lever $S^{23}$. This bent lever $S^{23}$, being pivoted to the frame of the machine at $S^{25}$, is made to operate by the cam-roller $S^{26}$, which engages with the cam-slot in the cam $S^{27}$. The lower end of the lever $S^{23}$ has a stud, $S^{24}$, which works in a slot made in the lower part of the lever $S^{15}$.

Vertical motion is communicated to the cutter-head by means of the bent lever $S^{20}$. This lever $S^{20}$ swings on the fixed pivot $S^{28}$, and is actuated by a cam-roller, $S^{21}$, which engages with the cam-groove in the cam $S^{22}$, Fig. 3. The forward end of the lever $S^{20}$ is connected by a roll, $S^{19}$, to the lever $S^{15}$, so that the sliding piece $S^{29}$ moves in a vertical plane with the movement of the lever $S^{20}$.

The plunger $S^6$ is drawn forward by the action of the lever $S^{39}$, Fig. 20. This lever $S^{39}$ is pivoted to the frame of the machine at $S^{40}$, and is actuated by a boss, $S^{42}$, on the cam $M^{13}$, which strikes a roller, $S^{41}$, on the said lever $S^{39}$ and throws it forward. This takes place at the time the cutters rest upon the shoe, the movement of the parts being adjusted so that the end of the plungers $S^6$ is at this time in position to be action upon by the lever $S^{39}$, as indicated in Fig. 20. After severing the wire the cutter-head begins its upward movement, and, acting through the rod $S^{36}$, Figs. 9 and 19, connected to $S^{10}$ by ears $s^{28}$ and $s^{29}$, Fig. 19, causes the vertical rack $S^{37}$, Fig. 9, to move upward, and, acting through the gear $L^{38}$, causes the feed-rollers $L^{23}$ and $L^{24}$ to withdraw the wire as far upward as the cutter-head rises. The feeding-in roll $L^{12}$ and the withdrawing-roll $L^{24}$ revolve on fixed studs, while their companion rolls, $L^{14}$ and $L^{23}$ revolve on studs that are attached to a rocking lever, $L^{16}$, Figs. 1, 4, and 9, so that the roll $L^{14}$ may be pressed forward toward the roll $L^{12}$, so as to make a working pair for the purpose of feeding in; or the roll $L^{23}$ may be thrown forward so as to form with the roll $L^{24}$ a pair of withdrawing-rolls. The rocking lever $L^{16}$ is pivoted on the pin $L^{17}$, Figs. 1, 9, and 12, and is formed with a lower end, $L^{28}$, projecting first backward and then at right angles, as shown at $L^{28}$, Figs. 3 and 9, and is connected by a crank-pin and slot at $L^{26}$, Figs. 2 and 9, said crank-pin being connected to the shaft $L^{27}$, Figs. 2, 3, and 9. The shaft $L^{27}$ is operated by a crank and pin at $L^{25}$, Fig. 3, which engages with a groove in the cam $L^{29}$, Fig. 3.

In order to adjust the rocking lever $L^{16}$ to its best working position, I have the pivot $L^{17}$, upon which it rocks, (see Fig. 12,) so arranged that it can be moved back and forth. To do this, I pass the pivot $L^{17}$ through a sliding plate, $L^{18}$, which rests against a part of the frame of the machine, as shown in Fig. 12. This sliding plate $L^{18}$ is pushed forward by a spring, $L^{19}$, and is adjusted by an eccentric, $L^{21}$, said eccentric turning upon a screw, $L^{22}$.

For convenience in turning the eccentric, a finger-piece is attached to its face. The rotating cutter opens about three-sixteenths of an inch, and it makes no difference whether the fastening be short or long, the cutting-edge of the two knives always meet on the line which is the point of contact of the wire and the surface of the outer sole. The cutters advance horizontally until they come to the point immediately above the fastening to be cut. Then they fall until the fixed cutter strikes the sole, and then, on completion of the downward motion of the lever $S^{15}$, the cutting device works and retires to its original position.

My machine, as described, is adapted for using a wood core made in the form of a wedge; but I do not confine myself to the use of wood for the core of the peg, as metal may be used for that purpose; nor do I confine myself to the shape of this core, as an ordinary shoe-nail or corrugated wire may be used for the core. If metal or wire is used for the core, then the peg-wood apparatus will be modified to adapt it for using metal.

The leading idea involved in this machine is to manufacture and drive a compound peg, the outer part of the said peg to be of such a nature as to admit of being clinched or headed on the inner part of the sole, while the core shall be adapted to give stability to the body of the peg, and to prevent it from being drawn through the sole.

I claim—

1. In a machine for forming and driving pegs, the combination of the horizontal sliding plate C, the vertical sliding plate D, and the awl E with the gage L L', index-plate $L^6$, rack-slide $L^{10}$, gear $L^{11}$, and feed-rolls $L^{12}$ $L^{14}$, all operating together substantially as described, and for the purpose set forth.

2. The combination of the horizontal sliding plate C, the vertical sliding plate D, and the awl E with the gage L L', index-plate $L^6$, rack-slide $L^{10}$, and plunger $P^{11}$, all operating together substantially as described, and for the purposes set forth.

3. The combination of the feed-rolls $L^{12}$ $L^{14}$, the formers H H', benders M M', and the plate $H^2$ with the horn N and header $N^3$, all operating together substantially as described, and for the purposes set forth.

4. The combination of the peg-wood feeding-roll $P^7$, severing-knife $P^3$, and pusher $P^2$ with the cutting-off knife $P^{15}$, all operating together substantially as described, and for the purposes set forth.

5. The combination of the hammer R', tube R, lever $R^5$, shaft $R^6$, and torsion-spring $R^7$ with the lever $R^8$, lever $R^{16}$, link $R^{17}$, lever $R^{18}$, and cam $R^{20}$, adapted to operate in combination with the let-off device $R^{10}$ $R^{11}$ $R^{12}$, substantially as described, and for the purposes set forth.

6. The combination of the formers H H' with the former-support T, sliding rod $T^2$, spring $i$, sliding rod $T^6$, and spring catch-pin $T^{11}$, all arranged to operate together substantially as described, and for the purposes set forth.

7. The combination of the cutter-head $S^{10}$, cutters S S', and their actuating mechanism with the rod $S^{36}$, rack $S^{37}$, gear $L^{38}$, and feed-rolls $L^{23}$ $L^{74}$, all operating together substantially as described, and for the purposes set forth.

In testimony whereof I have signed my name to this specification, in the presence of two subscribing witnesses, on this 8th day of June, A. D. 1885.

ELEAZER C. BENNETT.

Witnesses:
 FRANK G. PARKER,
 CHAS. SPALDING.